C. RAGAN.
Dried-Fruit Looseners.
No. 137,622.               Patented April 8, 1873.
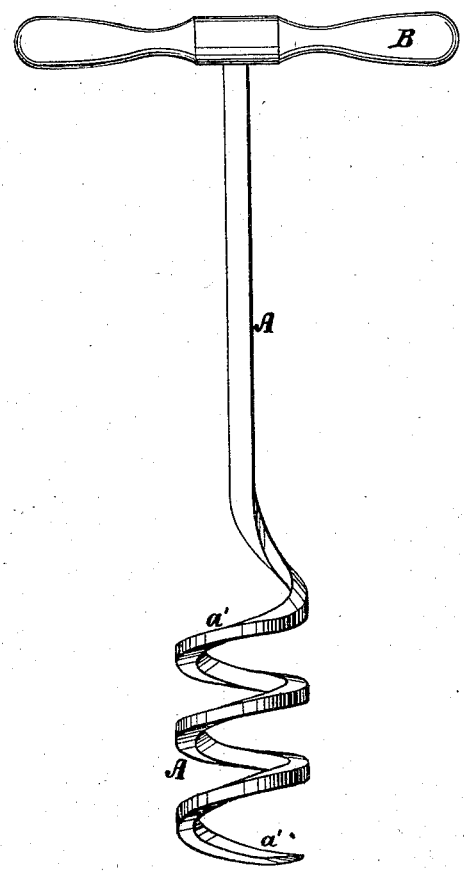

UNITED STATES PATENT OFFICE.

CORNELIUS RAGAN, OF WATERLOO, IOWA.

IMPROVEMENT IN DRIED-FRUIT LOOSENERS.

Specification forming part of Letters Patent No. 137,622, dated April 8, 1873; application filed February 8, 1873.

*To all whom it may concern:*

Be it known that I, CORNELIUS RAGAN, of Waterloo, in the county of Black Hawk and State of Iowa, have invented a new and useful Improvement in Dried-Fruit Loosener, of which the following is a specification:

The figure is a side view of my improved device.

My invention has for its object to furnish an improved device for loosening dried apples, dried peaches, and other dried fruit packed in barrels or boxes, and which shall be simple in construction, convenient in use, and effective in operation. The invention consists in an improved dried-fruit loosener, formed of a square steel rod, having its lower part flattened, coiled spirally and pointed, and provided with a handle, as hereinafter fully described.

A is the body of the fruit-loosener, which is made of a three-eighths inch square steel rod. The lower part of the body A is flattened so that its thickness may be about one-third of its breadth, and is coiled into a spiral, $a'$, of three or four turns, and of about three inches in diameter at the shank, and three and a half inches at the end. The tool terminates in a chisel-point, and is about eighteen or twenty inches in length. To the shank of the tool is secured a handle, B, about ten inches in length, and of a size convenient to be grasped.

In using the instrument it is turned into the mass of the dried fruit by turning it in the manner of an auger, and is then raised, loosening the fruit all around it.

Having thus described my invention, I claim as new and desire to secure by Letters Patent—

As an article of manufacture, a fruit-loosener consisting of a flat spiral blade having a chisel or wedge-shaped point slightly inclined from a plane perpendicular to that of the axis of tool, as and for the purpose described.

CORNELIUS RAGAN.

Witnesses:
 GEORGE W. BURPEE,
 WILLIAM GALE.